United States Patent [19]

Bühler et al.

[11] Patent Number: 5,071,443
[45] Date of Patent: Dec. 10, 1991

[54] BLUE AZO DYESTUFF MIXTURE FOR STRONG BLUE COLOR ON HYDROPHOBIC FIBERS

[75] Inventors: Ulrich Bühler, Alzenau; Hubert Kruse; Manfred Hähnke, both of Kelkheim; Margareta Boos, Hattersheim; Reinhard Kühn, Frankfurt, all of Fed. Rep. of Germany

[73] Assignee: Cassella Aktiengesellschaft, Frankfurt am Main, Fed. Rep. of Germany

[21] Appl. No.: 487,858

[22] Filed: Mar. 5, 1990

[30] Foreign Application Priority Data

Mar. 15, 1989 [DE] Fed. Rep. of Germany ....... 3908445

[51] Int. Cl.$^5$ .................. C09B 29/08; C09B 67/22; D06P 1/04
[52] U.S. Cl. .......................................... 8/639; 8/696; 8/921; 8/922; 8/924
[58] Field of Search ............................................. 8/639

[56] References Cited

U.S. PATENT DOCUMENTS 4,076,498 2/1978 Meszaros ..................... 8/662
4,257,943 3/1981 Hahnle ........................ 534/855
4,678,476 7/1987 Tappe et al. ............... 8/639

FOREIGN PATENT DOCUMENTS 2027733 2/1980 United Kingdom .
1582743 1/1981 United Kingdom .

Primary Examiner—A. Lionel Clingman
Attorney, Agent, or Firm—Connolly and Hutz

[57] ABSTRACT

The dyestuff mixture contains at least one dyestuff of the formula I

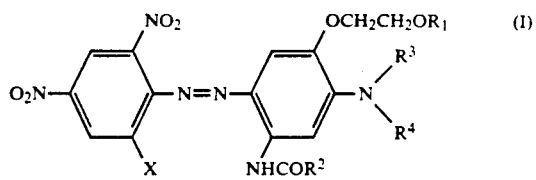

and at least one dyestuff of the formula II

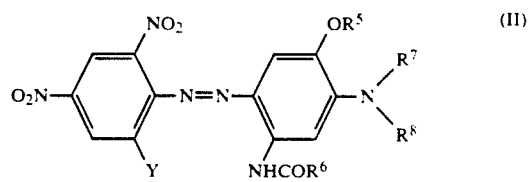

wherein
X and Y denote chlorine or bromine,
$R^1$ and $R^5$ denote methyl or ethyl,
$R^2$ and $R^6$ denote methyl, ethyl, n-propyl or i-propyl and
$R^3$, $R^4$, $R^7$ and $R^8$ denote, for example, $C_1$- to $C_{11}$-alkyl, in the weight ratio of I:II=(5 to 95):(95 to 5), and is, for example, outstandingly suitable for dyeing synthetic fibres.

14 Claims, No Drawings

BLUE AZO DYESTUFF MIXTURE FOR STRONG BLUE COLOR ON HYDROPHOBIC FIBERS

The invention relates to a dyestuff mixture containing or consisting of

I: at least one dyestuff of the formula I

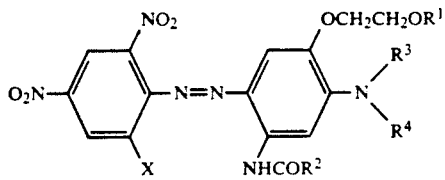

II: at least one dyestuff of the formula II

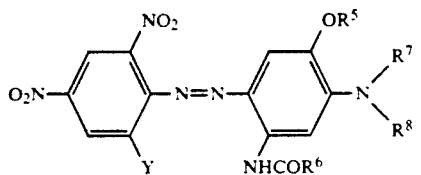

wherein

X and Y are identical or different and denote chlorine or bromine, $R^1$ and $R^5$ are identical or different and denote methyl or ethyl, $R^2$ and $R^6$ are identical or different and denote methyl, ethyl, n-propyl or i-propyl, $R^3$ and $R^4$ are identical or different and denote hydrogen or one of the radicals listed under $R^8$, and $R^7$ and $R^8$ are identical or different and denote $C_1$- to $C_{11}$-alkyl, which can optionally be substituted by chlorine, bromine, cyano, phenyl, phenoxy, hydroxy, ($C_1$- to $C_4$-alkoxy)-carbonyl, phenylcarbonyloxy, ($C_3$- to $C_5$-alkenyloxy)-carbonyloxy, ($C_1$- to $C_4$-alkoxy)carbonyloxy, phenoxy-carbonyloxy, tetrahydrofurfuryl, ($C_1$- to $C_4$-alkyl-tetrahydrofurfuryl, tetrahydropyronyl or ($C_1$- to $C_4$-alkyl)-tetrahydropyronyl, and/or can optionally be interrupted by 1 to 3 oxygen atoms; $C_1$- to $C_4$-alkoxy; $C_3$- or $C_4$-alkenyl; cyclohexyl, or benzyl which is optionally substituted by chlorine, bromine, nitro, cyano, $C_1$- to $C_4$-alkyl or alkoxy, and $R^8$ can additionally also denote ($C_1$- to $C_4$-alkyl)-carbonyloxy-($C_1$- to $C_{11}$)alkyl, and wherein the weight ratio between the components I:II=(5 to 95):(95 to 5).

Alkyl, alkoxy, alkenyl or alkenyloxy radicals, including when they occur as substituents of other radicals or in association with other groups, can be straight-chain or banched. In the event of substitutions, substitutions by one or more substituents can occur. In the case of polysubstitution, disubstitution is preferred.

Examples of suitable radicals $R^7$; and $R^8$, which can optionally also be $R^3$ and/or $R^4$, are: methyl, ethyl, n-propyl, i-propyl, n-butyl, i-butyl, sec.-butyl, tert.-butyl, n-pentyl, i-pentyl, n-hexyl, i-hexyl, 2,3-dimethyl-butyl, n-heptyl, i-heptyl, n-octyl, i-octyl, 3-methyl-heptyl, n-nonyl, i-nonyl, n-decyl, i-decyl, n-undecyl, i-undecyl, 2-methyl-butyl, 2-ethyl-butyl, 2- or 3-methyl-pentyl, 2-ethyl-hexyl, 2-chloro-ethyl, 2-bromc-ethyl, 2-cyano-ethyl, 2-phenethyl, 3-chloro-, 3-bromo-, 3-phenyl-propyl, 2-hydroxy- or 2-phenoxyethyl, 2- or 3-hydroxy-prop-yl, 2- or 3-hydroxy-butyl, 2- or 3-phenoxy-propyl, 2- or 3-phenoxy-butyl, 2,3-dihydroxy-propyl or -butyl, 3-chloro-2-hydroxy-propyl, 2-methoxycarbonyl-ethyl, 3-methoxycarbonyl-ethyl, 3-propoxycarbonyl-propyl, 3-i-propoxycarbonypropyl, 4-butoxybutyl, 2-phenylcarbonyloxy-ethyl, 5-phenylcarbonyloxy-pentyl, 2-phenoxycarbonyloxy-ethyl, 3-phenoxycarbonyloxypropyl, 2-allyloxycarbonyloxy-ethyl, 3-methallyloxycarbonyloxy-propyl, 4-propenyloxycarbonyloxy-butyl, 2-(1-, 2- or 3-butenyl)-oxycarbonyloxy-ethyl, 2-methoxycarbonyloxy-ethyl, 3-i-propoxycarbonyloxy-propyl, 4-butoxycarbonyloxy-butyl, 2-(2- or 3-tetrahydrofuryl)-ethyl, 2-(3-ethyl-tetrahydrofurfur-2-yl)ethyl, 2-(tetrahydro-4-pyron-2- or -3-yl)-ethyl, 3-(2-ethyltetrahydro-4-pyron-3-yl)-propyl, 2-methoxy-ethyl, 3-methoxypropyl, 3-methoxy-2-methyl-propyl, 2-ethoxy-ethyl, 3-i-propoxypropyl, 4-i-butoxy-2-methyl-propyl, allyl, methallyl, propenyl, crotyl(=2-butenyl), 1- or 3-butenyl, 2-hydroxy-3-methoxyl-propyl, 2-hydroxy-3-ethoxy-propyl, 2-hydroxy-3-i-propoxy-propyl, 2-hydroxy-3-propoxy-propyl, 2-hydroxy-3-butoxy-propyl, 2-hydroxy-3-phenoxy-propyl, 2-acetoxy-3-methoxy-propyl, 2-acetoxy-3-ethoxypropyl, 2-acetoxy-3-propoxy-propyl, 2-acetoxy-3-butoxy-propyl, 2-acetoxy-3-phenoxy-propyl, methoxy, ethoxy, n- and i-propoxy, n- and i-butoxy, 2-ethoxy-ethyl, benzyl, 4-chloro-, 4-bromo-, 4-nitro-, 4-cyano-, 4-methyl- or 4-methoxy-benzyl, 2-, 3- or 4-ethoxy-benzyl and 2,3-dichlorobenzyl, and furthermore radicals of the formulae: $-CH_2CH_2OCH_2CH_2OC_2H_5$; $-CH_2CH_2OCH_2CH_2OCH_2CH_2OC_2H_5$; $-CH_2CH_2OCH_2CH_2OCH_3$; $-(CH_2CH_2O)_3-CH_3$; $-(CH_2CH_2O)_3-n-C_3H_7$; $-(CH_2CH_2O)_3-i-C_3H_7$; $-(CH_2CH_2O)_2-n-C_4H_9$; $-(CH_2CH_2O)_2-CH_3$; $-(CH_2CH_2O)_2-C_6H_5$; $-CH_2CH_2O-n-C_4H_9$ and $-(CH_2CH_2O)_2-CO-CH_3$.

Examples of further suitable radicals $R^8$ and, if appropriate, $R^3$ and/or $R^4$ are 2-acetoxy-ethyl, 4-acetoxybutyl, 2-propionyloxy-ethyl, 2-butyryloxy-ethyl, 4-butyryloxy-butyl.

The invention also relates to processes for the preparation of the dyestuff mixture according to the invention and their use for dyeing and printing hydrophobic fibre materials and mixtures thereof with naturally occurring fibrous substances It is already known that dyestuff mixtures which contain at least one dyestuff of the formula I or dyestuff mixtures which contain at least one dyestuff of the formula II have improved dyeing properties in comparison with the individual dyestuffs (compare European Patent 222,255 and German Patent 2,818,653).

It has now been found, surprisingly, that the dyestuff mixture according to the invention has considerably improved dyeing properties in comparison with the individual dyestuffs and also in comparison with the mixtures of German Patent 2,818,653 and European Patent 222,255.

Preferred radicals in the formula I and II for $R^1$, $R^2$, $R^5$ and/or $R^6$ are methyl or ethyl and/or for $R^3$ are hydrogen, ethyl or n-propyl and/or for $R^4$ are hydrogen and/or for $R^7$ and/or $R^8$ are ethyl, n-propyl or allyl, $R^7$ and $R^8$ preferably being identical.

In the dyestuff mixtures according to the invention, the weight ratio between the components I:II=(5 to 95):(95 to 5), preferably (70 to 30):(30 to 70), particularly preferably (40 to 60):(60 to 40). Components I and II can consist of one, two, three or more dyestuffs of the formulae I and II. Components I and/or II preferably consist of in each case two dyestuffs of the formula I or II, especially preferably of in each case one dye-stuff of the formula I or II. If component I or II contains two or more dyestuffs, their proportion in the two components can vary within wide limits If components I and/or II preferably contain in each case two dyestuffs, one dyestuff is preferably present in components I and/or II in an amount of 20 to 80 parts by weight and the other in an amount of 80 to 20 parts by weight.

The dyestuff mixtures according to the invention contain or comprise the two components I and II. The abovementioned weight ratios relate merely to the dyestuff constituent comprising components I and II of the dyestuff mixtures according to the invention. The dyestuff mixtures according to the invention may additionally contain standardizing agents and/or auxiliaries etc., and if appropriate other dyestuffs.

The dyestuff mixtures according to the invention can be in the form of pulverulent or liquid dyestuff formulations.

The pulverulent dyestuff formulations normally have a dyestuff content of from 20 to 60% by weight. The remainder of 20 to 40% by weight consists of standardizing agents and/or auxiliaries, such as, for example, dispersing agents, wetting agents, emulsifiers, preservatives, oxidizing agents, dust removal agents and the like. The liquid dyestuff formulations present in aqueous suspension usually have a dyestuff content of 20 to 40% by weight and a standardizing agent and/or auxiliary content of 20 to 40% by weight, the remainder being water. In addition to dispersing agents, emulsifiers and wetting agents, the liquid dyestuff formulations can also additionally contain agents which delay drying out, such as, for example, glycols or glycerol, and/or preservatives, fungicides and the like as auxiliaries.

The dyestuff mixtures according to the invention can be prepared by various processes, thus, for example, by mixing already finished individual dyestuffs I and II or by mixing non-finished individual dyestuffs I and II and a finish carried out subsequently or during the mixing operation. Mixing of non-finished individual dyestuffs of components I and II is preferably carried out with the addition of dispersing agents and if appropriate other auxiliaries. This mixing process is advantageously carried out in connection with the wet comminution to be carried out for finishing disperse dyestuffs, at temperatures of usually 10° to 180° C., in particular 10° to 90° C., preferably 30° to 60° C., advantageously in suitable mills, for example colloid, ball, bead or sand mills, or dispersion kneaders, but especially in the case of already finished individual dyestuffs can also be effected in suitable mixers, such as, for example, tumble mixers, or by mixing manually or by stirring into dispersing agents or dye liquors or by incorporation into printing pastes.

During wet comminution of the dyestuffs, the dyestuffs are suspended in a liquid medium, preferably in water, together with dispersing agents and the mixture is exposed to the effect of shearinq forces. During this, the dyestuff particles originally present are comminuted mechanically to the extent that an optimum specific surface area is achieved and sedimentation of the dyestuffs is as low as possible. The particle size of the dyestuffs is in general about 0.1 to 10 μm, and in many cases between 0.5 and 5 μm and preferably about 1 μm.

Dispersing agents are also used during wet comminution. Suitable dispersing agents are, for example, anionic or non-ionic dispersing agents, which can also be employed together. Anionic dispersing agents are, for example, condensation products of aromatic sulphonic acids and formaldehyde, in particular condensation products of alkylnaphthalenesulphonic acids and formaldehyde, condensation products of optionally substituted phenol with formaldehyde and sodium bisulphite, alkali metal salts of condensation products of optionally substituted phenol, naphthalene- or naphtholsulphonic acids, formaldehyde and sodium bisulphite, alkali metal salts of condensation products of optionally substituted phenolsulphonic acids, formaldehyde and urea and alkali metal salts of ligninsulphonic acids; alkyl- or alkylaryl-sulphonates and alkyl-aryl polyglycol ether-sulphates. Non-ionic dispersing agents or emulsifiers are, for example, reaction products of alkylene oxides, such as, for example, ethylene oxide or propylene oxide, with compounds which can be alkylated, such as, for example, fatty alcohols, fatty amines, fatty acids, phenols, alkylphenols, arylalkylphenols, arylalkylarylphenols and carboxylic acid amides, such as, for example, addition products of 5 to 10 ethylene oxide units on $C_8$–$C_{10}$-alkylphenols.

The dyestuff dispersions obtained during the wet comminution should be pourable for most methods of use and can also additionally contain further auxiliaries, for example those which act as oxidizing agents, such as, for example, sodium m-nitro-benzenesulphonate, or fungicidal agents, such as, for example, sodium o-phenyl-phenolate and sodium penta-chlorophenolate. For economic reasons, the dyestuff content does not usually fall below 20% by weight.

The liquid dyestuff dispersions thus obtained can very advantageously be used for preparing printing pastes and dye liquors. They offer particular advantages, for example, in continuous processes, in which the dyestuff concentration of the dye liquors must be kept constant by continuous feeding of dyestuff into the running apparatus.

For certain fields of use, powder formulations are preferred. These powders contain the dyestuffs, dispersing agents and other auxiliaries, such as, for example, wetting agents, oxidizing agents, preservatives and dust removal agents.

A preferred preparation process for the pulverulent dyestuff formulations comprises removing the liquid from the liquid dyestuff dispersions described above, for example by vacuum drying, freeze drying, by drying on roller driers but preferably by spray drying.

If the dyestuff mixtures are to be used for textile printing, the required amounts of the dyestuff formulations are kneaded together with thickeners, such as, for example, alkali metal alginates or the like, and if appropriate other additives, such as fixing accelerators, wetting agents and oxidizing agents, to give printing pastes.

The individual dyestuffs of the formula I and II are known (compare, for example, DE-B-2,736,785, DE-B-2,833,854 and U.S. Pat. No. 4,076,498, or can be prepared in a manner which is known per se by diazotization and coupling of 6-bromo-2,4-dinitro-aniline or 6-chloro-2,4-dinitro-aniline and subsequent coupling to coupling components of the formula Ia

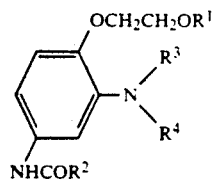

or of the formula IIa

The coupling components of the formulae Ia and IIa are known or can be prepared by processes which are known per se.

Dyestuff mixtures according to the invention can also preferably be prepared by diazotization and subsequent coupling In this procedure, either a mixture of 6-bromo-2,4-dinitro-aniline and 6-chloro-2,4-dinitro-aniline is diazotized together and then coupled to a mixture of two different coupling components of the formulae Ia and IIa, or one diazo component (6-bromo-2,4-dinitro-aniline or 6-chloro-2,4-dinitro-aniline) is diazotized and then coupled to a mixture of two different coupling components of the formulae Ia and IIa. The diazotization and coupling here are carried out in a manner which is known per se and the mixture of the dyestuffs can be isolated in the customary manner, dried, finished and converted into a pulverulent or liquid formulation in a manner already mentioned.

It is advantageous to prepare the dyestuff mixtures according to the invention from those individual dyestuffs which have been subjected to pretreatment with heat. In this pretreatment with heat, the dyestuffs are heated at temperatures of 50° to 180° C., in particular 50° to 150° C. and preferably 90° to 130° C., for half an hour to several hours, if appropriate under pressure and preferably in water and then cooled again. This heating is advantageously carried out in the presence of one or more dispersing agents and/or emulsifiers and/or one or more organic solvents. Examples of such solvents are methanol, ethanol, dimethylformamide or dimethyl sulphoxide, but preferably solvents of low water-solubility, such as toluene, chlorobenzene, 1,2-dichlorobenzene or butyl acetate. These solvents are distilled off again after the heat treatment.

It is particularly advantageous if a mixture of the dyestuff components I and II is subjected to the abovementioned pretreatment with heat or if a mixture of the dyestuff components I and II is heated at temperatures of 50° to 180° C., in particular 50° to 150° C., preferably for half an hour to several hours, in the course of their preparation. The desired formation of mixed crystals between the individual dyestuffs is in this way prompted. Such heating of a dyestuff mixture can be carried out, for example, before the finishing operation or in the course of the finishing operation, the comments already made for the heat pretreatment of the individual dyestuffs applying in respect of the presence of organic solvents, dispersing agents and/or emulsifiers.

The desired formation of mixed crystals between the individual dyestuffs is also effected by dissolving the individual dyestuffs together in an organic solvent, such as, for example, dimethylformamide, if appropriate by heating, and then crystallizing or precipitating them out of this solution. The resulting dyestuff mixture or the resulting mixed crystals are isolated, for example by filtration, freed from solvent residues, for example by washing, and converted into a dyestuff formulation in the manner already mentioned.

The dyestuff mixtures according to the invention, as such or as a mixture with other disperse dyestuffs, are outstandingly suitable for dyeing and printing hydrophobic synthetic fibre materials and mixtures thereof with naturally occurring fibrous substances. Surprisingly, they are superior to the individual dyestuffs in respect of dyeing properties and coloristic fastnesses, such as, for example, thermomigration, fastness to thermofixing, fastness to water, washing and rubbing and in particular in their build-up and exhaustion capacity and in their levelling capacity. Moreover, outstandingly deep dyeings are still obtained, with excellent exhaustion of the bath, with the dyestuff mixtures according to the invention even when the dyeing temperatures are reduced and the dyeing time is shortened. They are moreover insensitive towards Ca, Mg, Cu or Fe ions, which cause precipitates with other dyestuffs. Exact blue dyeings are already obtained during a short dyeing time with the dyestuff mixtures according to the invention even under adverse mechanical or substrate-related dyeing conditions. This is particularly important when used in the dyeing of wound packages. The dyestuff mixtures according to the invention can be used by themselves (that is to say in the blue range) and also in combination with commercially available other dyestuffs, including those of different shades (trichromism).

Possible hydrophobic synthetic materials are, for example: cellulose 2½-acetate, cellulose triacetate, polyamides and in particular high molecular weight polyesters and mixtures thereof with natural fibrous substances, such as, for example, cotton, regenerated cellulose fibres or wool.

Possible high molecular weight polyester fibres are, in particular, those based on polyethylene terephthalate, polybutylene terephthalate, polycyclohexylene terephthalate or polyhydroxypropylene terephthalate, as well as modified polyester fibres, such as are obtained, for example, by copolymerization with di- or triethylene glycol, polyethylene glycol, glycerol, isophthalic acid or phosphorus compounds.

In mixtures of hydrophobic fibrous substances with wool, regenerated cellulose or cotton, the content of the hydrophobic material, in particular of the polyester, can be 10 to 90% by weight, in particular 30 to 70% by weight.

To prepare the dye liquors, the required amounts of the dyestuff formulations are diluted with the dyeing medium, preferably with water, to the extent that a liquor ratio of 1:5 to 1:50 results for the dyeing. Other dyeing auxiliaries, such as dispersing, wetting and fixing auxiliaries, are in general additionally added to the liquors.

The materials to be dyed or printed can be, for example, in the form of sheet-like, flocked or thread-like structures and processed, for example, to yarns or woven or knitted textile materials. Dyeing of the fibre goods mentioned with the dyestuff mixtures according to the invention is carried out in a manner which is known per se, preferably from aqueous suspension, if appropriate in the presence of carriers, at between 80 and about 125° C. by the exhaustion process, or in the absence of carriers by the HT process in a dyeing autoclave at about 105° to 140° C., and by the so-called thermosol process, the goods being padded with the dye liquor and the dyestuff then being fixed at about 175° to 230° C. Printing of the materials mentioned can be carried out by a procedure in which the goods printed with printing pastes containing dyestuff mixtures according to the invention are treated with HT steam, pressurized steam or dry heat at temperatures between about 110° to 230° C., if appropriate in the presence of a carrier, in order to fix the dyestuff.

The actual dyeing can advantageously be followed by a reductive after-treatment or an after-treatment assisted by dispersing agents in order to remove dyestuff portions which have not been fixed completely.

When using mixtures of polyester fibres with wool, cotton or regenerated cellulose, the admixed fibres can be dyed in the same or a different colour shade (melanges, woven patterns) before or after dyeing the polyester with suitable dyestuffs.

The individual dyestuffs I and II are advantageously combined in dyestuff mixtures according to the invention so that a dyestuff which, for example, exhibits a red change in colour shade under the light of an incandescent lamp is combined with a dyestuff which, for example, exhibits a green change in colour shade under the light from an incandescent lamp. Controlled adjustment of the evening colour can in this way be performed from various mixing partners.

Particularly preferred dyestuff mixtures are those which contain

I) the dyestuff of the formula III

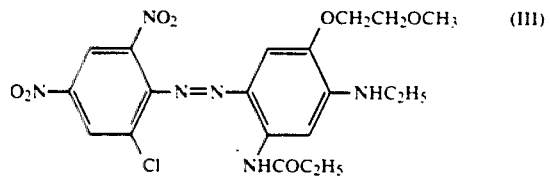

and

II) the dyestuff of the formula IV

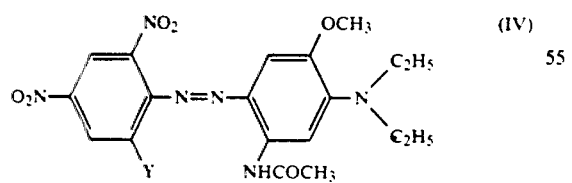

in the weight ratio of I:II = (60 to 40):(40 to 60), preferably 1:1, or consist of these dyestuffs, wherein Y denotes chlorine or bromine, preferably bromine.

Those dyestuff mixtures according to the invention which contain

I) the dyestuff of the formula III

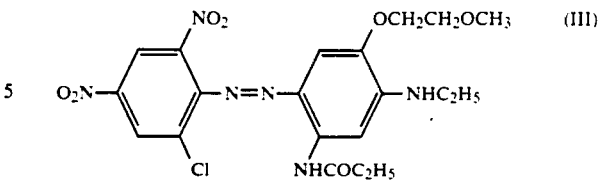

Ia) the dyestuff of the formula V

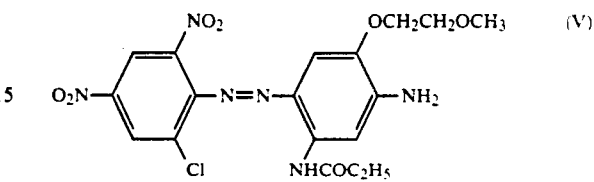

II) the dyestuff of the formula IV

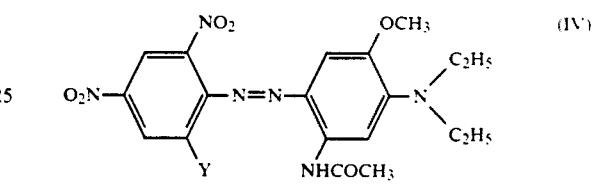

wherein Y denotes chlorine or bromine, preferably bromine, in the weight ratio of (I+Ia):II = (60 to 40):(40 to 60) or consist of these dyestuffs, the weight ratio of I:Ia being (80 to 20):(20 to 80), are also preferred.

Those dyestuff mixtures according to the invention which

I) the dyestuff of the formula III

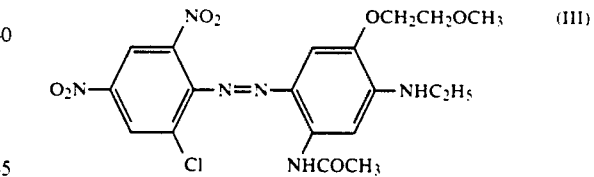

II) the dyestuff of the formula VI

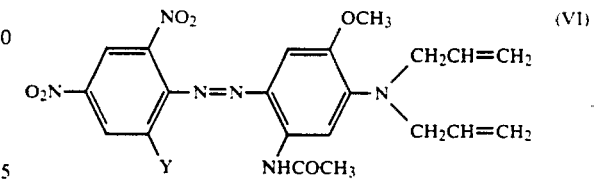

in Y denotes chlorine or bromine, preferably bromine, in the weight ratio of I:II = (60 to 40):(40 to 60) or consist of these dyestuffs, are furthermore also preferred.

The parts mentioned in the following examples are, unless stated otherwise, parts by weight and percentage data denote percentages by weight.

EXAMPLE 1 a) 217.5 parts of 6-chloro-2,4-dinitro-aniline are introduced into 2000 parts of concentrated sulphuric acid. 320 parts of nitrosylsulphuric acid (11.5% of $N_2O_3$) are allowed to run in slowly at 15° to 20° C., while stirring and cooling, and the mixture is subsequently stirred at 15° C. for at least 3 hours.

266 parts of 2-ethylamino-4-propionylamino-5-(2-methoxy)-ethoxy-benzene are added to a mixture of 2000 parts of water, 300 parts by volume of concentrated hydrochloric acid and 10 parts of amidosulphonic acid. 4000 parts of ice are added and the diazonium salt solution prepared under a) is allowed to run in slowly at −5 to +3° C., while stirring thoroughly. The reaction is brought to completion by addition of sodium acetate up to a pH of 3. The resulting dyestuff is filtered off with suction, washed neutral and salt-free with water and dried. 418 parts of the dyestuff of the formula III

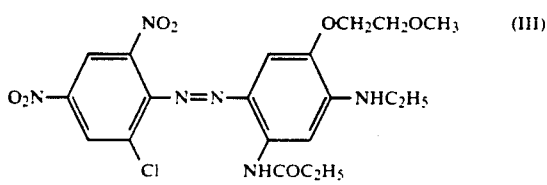

are obtained.

b) 262 parts of 6-bromo-2,4-dinitro-aniline are introduced into 2000 parts of concentrated sulphuric acid. If the procedure is otherwise as described in Example 1a), a diazonium salt solution of 6-bromo-2,4-dinitroaniline is obtained.

244 parts of 3-N,N-diethylamino-4-methoxyacetanilide are added to a mixture of 700 parts of water, 300 parts of ice, 70 parts of concentrated sulphuric acid and 10 parts of amidosulphonic acid. The diazonium salt solution is now allowed to run in at about 10° C., while uniformly adding 5000 parts of ice, the pH being kept at about 2 by addition of 27% strength sodium hydroxide solution. When the coupling has ended, the resulting dyestuff is filtered off with suction, washed neutral and saltfree with water and dried. 450 parts of the dyestuff of the formula IVa

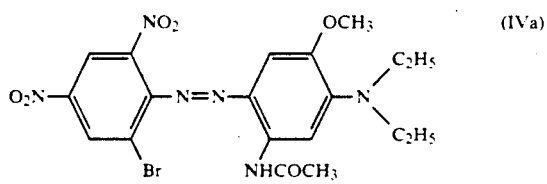

are obtained. c) A fine dyestuff dispersion is prepared from 20 parts of the dyestuff of the formula III, 20 parts of the dyestuff of the formula IVa and 60 parts of a dispersing agent from the ligninsulphonate series by aqueous grinding in a bead mill and this dispersion is dried by spray drying. The dyestuff formulation contains the dyestuffs of the formulae III and IV in the weight ratio 1:1.

d) 2.2 g of the dyestuff formulation thus obtained are dispersed in 2000 g of water. 4 g of ammonium sulphate, 2 g of a commercially available dispersing agent based on a condensation product of sodium naphthalenesulphonate and formaldehyde and 2 g of a condensation product of m-cresol, formaldehyde and sodium sulphite are added to the dispersion, and a pH of 5.5 is established lished with acetic acid. 100 g of a texturized polyester fabric based on polyethylene glycol terephthalate are introduced into the dye liquor thus obtained and dyeing is carried out at 120° C. for 30 minutes. After subsequent rinsing, reductive after-treatment with a 0.2% strength sodium dithionite solution at 70° to 80° C. for 15 minutes, rinsing and drying, a deep blue dyeing with outstanding coloristic properties is obtained.

If 100 g of a texturized polyester fabric based on polyethylene glycol terephthalate are again introduced into the dyebath to prepare an exhaustion test dyeing, dyeing is carried out at 135° C. for 1 hour and the exhaustion test dyeing is aftertreated as above for the actual dyeing, an almost colourless dyeing is obtained.

EXAMPLE 2 a) 217.5 parts of 6-chloro-2,4-dinitro-aniline are diazotized as under 1a) and coupled analogously to a mixture of 59.5 parts of 2-amino-4-propionylamino-5(2-methoxy)-ethoxybenzene and 199.5 parts of 2-ethylamino-4-propionylamino-5-(2-methoxy)-ethoxybenzene. A dyestuff mixture which contains 25 parts of the dyestuff of the formula V

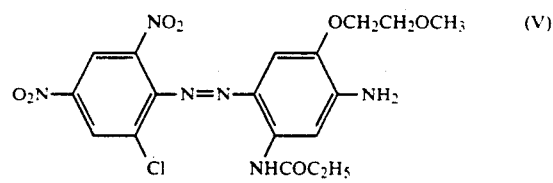

and 75 parts of the dyestuff of the formula III is obtained.

b) A fine dyestuff dispersion is prepared, as described in Example 1, from 24 parts of the resulting dyestuff mixture, 16 parts of the dyestuff of the formula IVa and 60 parts of a dispersing agent which is customary in practice, from the series comprising sulphonated naphthalene-formaldehyde condensation products, by aqueous grinding in a bead mill and this dispersion is then dried by spray drying. The weight ratio of the dyestuffs of the formulae III:V:IVa in the dyestuff formulation thus obtained is 45:15:40.

c) 0.2 g of this dyestuff powder is stirred into 200 ml of water, and 0.2 g of a commercially available dispersing agent based on a condensation product of m-cresol, formaldehyde and sodium sulphite, 0.3 g of a commercially available carrier based on methylnaphthalene, 0.4 g of crystalline sodium acetate and 1.2 ml of 30% strength acetic acid are added, while stirring. The pH of the dyebath is 4.5. 10 g of a polyester fabric based on polyethylene glycol terephthalate are introduced into this dye-bath and dyeing is carried out in a dyeing bomb at 106° C. under pressure for one hour. The dyeing is finished as described above by rinsing, reductive after-treatment, renewed rinsing and drying and a deep blue dyeing with very good coloristic properties is likewise obtained.

EXAMPLE 3 a) If the 20 parts of the dyestuff of the formula IVa in Example 1c) are replaced by 20 parts of the dyestuff of the formula VI

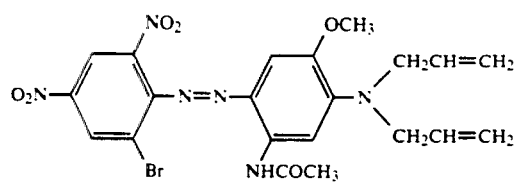

which is prepared analogously to the instructions in Example 1b) from 262 parts of 2-bromo-2,4-dinitroaniline and 269 parts of 3-N,N-diallylamino-4-methoxyacetanilide, a pulverulent dyestuff formulation which contains the dyestuffs of the formulae III and VI in the weight ratio of 1:1 is likewise obtained.

b) Dyeing is carried out in accordance with Example 1d) using the dyestuff formulation prepared. In this process, however, instead of the polyester fabric mentioned in Example 1d), a mixed fabric of 50 g of polyester fibre and 50 g of cotton or regenerated cellulose fibres is employed and the procedure is otherwise as in Example 1d), to give a deep blue dyeing on the polyester portion with only a slight staining of the cotton or regenerated cellulose fibre portion.

The cotton or regenerated cellulose fibre portion is decolorized completely by an after-treatment for 15 minutes at 80° C. with an aqueous liquor containing a customary amount of sodium dithionite and sodium hydroxide solution.

EXAMPLE 4

If the polyester fabric based on polyethylene glycol terephthalate mentioned in Example 1d) is replaced by a fabric of a commercially available polyester fibre of any other desired type, an equally good dyeing result is obtained.

EXAMPLE 5

If the dyeing is carried out in accordance with the instructions of Example 1 using a polyester fibre wound package (muff having a wound density of 300 g/l) so that there is one-sided liquor circulation from the inside outwards and a dye liquor throughput of 10 $l.kg^{-1}.minute^{-1}$ with a rate of heating up between 60° and 130° C. of 2°/minute and with a dyeing time at 130° C of 15 minutes, a completely level dyeing is obtained.

What is claimed is:

1. A dyestuff mixture comprising
I: at least one dyestuff of the formula I, and

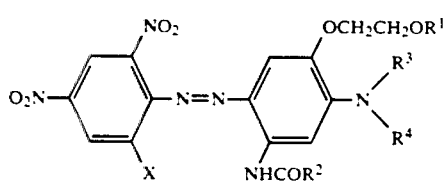

II: at least one dyestuff of the formula II

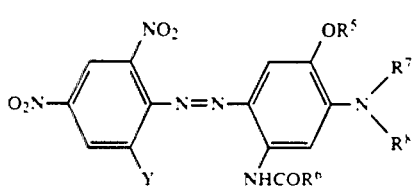

wherein
X and Y are identical or different and denot chloro or bromo,
$R^1$ and $R^5$ are identical or different and denote methyl, ethyl, n-propyl or i-propyl,
$R^3$ and $R^4$ are identical or different and denote hydrogen or one of the radicals listed under $R^8$, and
$R^7$ and $R^8$ are identical or different and denote $C_1$- to $C_{11}$-alkyl, which can optionally be interrupted by 1 to 3 oxygen atoms and/or be substituted by chlorine, bromine, cyano, phenyl, phenoxy, hydroxy, ($C_1$- to $C_4$-alkoxy) -carbonyl, phenylcarbonyloxy, ($C_3$- to $C_5$-alkenyloxy)-carbonyloxy, ($C_1$- to $C_4$-alkoxy) -carbonyloxy, phenoxy-carbonyloxy, tetrahydrofurfuryl, ($C_1$ to $C_4$-alkyl-tetrahydrofurfuryl, tetrahydropyronyl or ($C_1$- to $C_4$-alkyl) tetrahydropyronyl; $C_1$ to $C_4$-alkoxy; $C_3$- or $C_4$-alkenyl; cyclohexyl, or benzyl which is optionally substituted by chloro, bromo, nitro, cyano, $C_1$- to $C_4$-alkyl or alkoxy, and $R^8$ can additionally also denote ($C_1$to $C_4$-alkyl)-carbonyloxy-($C_1$ to $C_{11}$)alkyl and wherein the weight ratio between the components I:II=(30 to 70): (70 to 30).

2. A dyestuff mixture according to claim 1, characterized in that one or more of $R^1$, $R^2$, $R^5$ or $R^6$ denote methyl or ethyl, $R^3$ denotes hydrogen, ethyl or n-propyl, $R^4$ denotes hydrogen, $R^7$ or $R^8$ or both denote ethyl, n-propyl or allyl.

3. A dyestuff mixture according to claim 1 wherein the weight ratio between components I:II=(40 to 60):(60 to 40).

4. A dyestuff mixture according to claim 1, characterized in that it contains
I) the dyestuff of the formula III

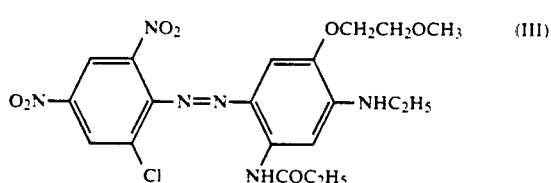

and
II) the dyestuff of the formula IV

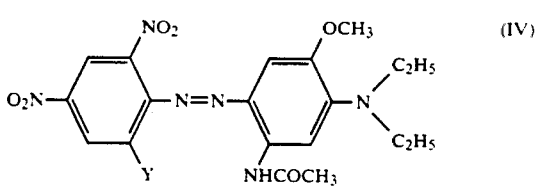

in the weight ratio of I:II=(60 to 40):(40 to 60).

5. The dyestuff mixture according to claim 4, wherein the weight ratio of I:II=1:1.

6. The dyestuff mixture according to claim 5, wherein Y is selected from chloro or bromo.

7. A dyestuff mixture according to claim 1, characterized in that it contains
I) the dyestuff of the formula III

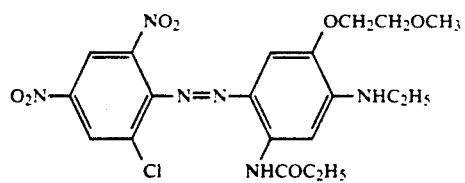

Ia) the dyestuff of the formula V

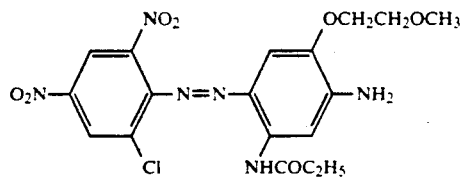

II) the dyestuff of the formula IV

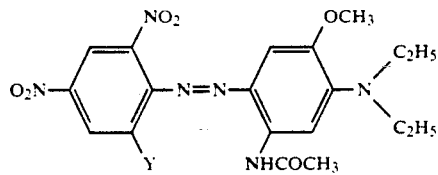

wherein Y denotes chloro or bromo, in the weight ratio of (I+Ia):II=(60 to 40):(40 to 60).

8. A dyestuff mixture according to claim 7 wherein the weight ratio of I:Ia is (80 to 20):(20 to 80).

9. A dyestuff mixture according to claim 1, characterized in that it contains

I) the dyestuff of the formula III

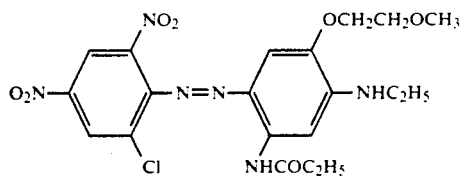

and

II) the dyestuff of the formula IV

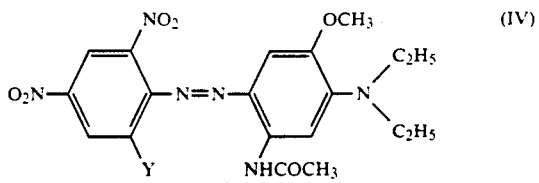

wherein Y denotes chloro or bromo in the weight ratio of I:II=(60 to 40):(40 to 60).

10. A process for the preparation of a dyestuff mixture according to claim 1, characterized in that already finished individual dyestuffs of components I and II are mixed with one another.

11. A process for the preparation of a dyestuff mixture according to claim 1, characterized in that non-finished individual dyestuffs of components I and II are mixed with one another and then finished together.

12. A process for the preparation of a dyestuff mixture according to claim 1, characterized in that 6-bromo-2,4-dinitro-aniline or 6-chloro-2,4-dinitro-aniline o both are diazotized and then coupled to a mixture of two different coupling components of formulae Ia and IIa

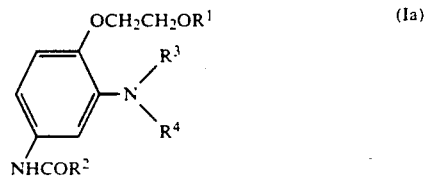

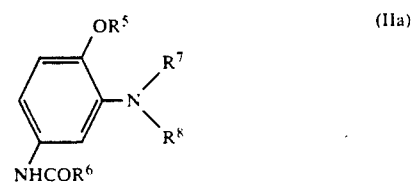

13. A fibre dyed with the dyestuff mixture according to claim 1.

14. A fibre printed with the dyestuff mixture according to claim 1.

UNITED STATES PATENT AND TRADEMARK OFFICE
CERTIFICATE OF CORRECTION

PATENT NO. : 5,071,443
DATED : December 10, 1991
INVENTOR(S) : Ulrich Bühler, et al It is certified that error appears in the above-indentified patent and that said Letters Patent is hereby corrected as shown below:

In column 8, formula III, between lines 40 and 45, "$NHCOCH_3$" should read --$NHCOC_2H_5$--.

Signed and Sealed this

Sixth Day of September, 1994

Attest:

BRUCE LEHMAN

*Attesting Officer*     *Commissioner of Patents and Trademarks*